(12) United States Patent
Diab et al.

(10) Patent No.: US 9,203,779 B2
(45) Date of Patent: Dec. 1, 2015

(54) MEDIA CONVERTER TO ENABLE ETHERNET IN THIN-PROFILE MOBILE DEVICES

(71) Applicant: Broadcom Corporation, Irvine, CA (US)

(72) Inventors: Wael William Diab, San Francisco, CA (US); Michael David Johas Teener, Santa Cruz, CA (US)

(73) Assignee: BROADCOM CORPORATION, Irvine, CA (US)

( * ) Notice: Subject to any disclaimer, the term of this patent is extended or adjusted under 35 U.S.C. 154(b) by 188 days.

(21) Appl. No.: 13/906,812

(22) Filed: May 31, 2013

(65) Prior Publication Data

US 2014/0010240 A1    Jan. 9, 2014

Related U.S. Application Data

(60) Provisional application No. 61/667,687, filed on Jul. 3, 2012.

(51) Int. Cl.
*H04L 12/46* (2006.01)
*H04L 12/933* (2013.01)

(52) U.S. Cl.
CPC ............ *H04L 49/15* (2013.01); *H04L 12/4625* (2013.01)

(58) Field of Classification Search
CPC ................... H04L 2012/46; H04L 2012/5614; H04L 2012/18
USPC .................................................. 370/501, 901
See application file for complete search history.

(56) References Cited

U.S. PATENT DOCUMENTS

| | | | |
|---|---|---|---|
| 2002/0013094 A1* | 1/2002 | Jones et al. | 439/625 |
| 2003/0185157 A1* | 10/2003 | Chen et al. | 370/235 |
| 2010/0262850 A1* | 10/2010 | Lin et al. | 713/320 |

FOREIGN PATENT DOCUMENTS

| | | | | |
|---|---|---|---|---|
| CA | 2416068 A1 * | 1/2001 | | H04L 12/66 |
| EP | 1484874 A2 | 12/2004 | | |
| EP | 2360868 A1 | 8/2011 | | |

OTHER PUBLICATIONS

EP Search Report, Nov. 20, 2013.
Smaller Alternative to RJ45 Ethernet Connector, Apr. 15, 2013.
Office Action for Taiwan Patent Application No. 102123798 mailed May 21, 2015 (including English summary).

* cited by examiner

*Primary Examiner* — Pao Sinkantarakorn
*Assistant Examiner* — Stephen Steiner
(74) *Attorney, Agent, or Firm* — Foley & Lardner LLP; Christopher J. McKenna; Daniel E. Rose

(57) ABSTRACT

A media converter to enable Ethernet in thin-profile mobile devices. The media converter can be designed to interface with a thin-profile mobile device via a short-reach Ethernet link and to interface with a network device via a conventional Ethernet link. Protocol conversion is therefore obviated, while accommodating a low-profile Ethernet port in the mobile device.

20 Claims, 4 Drawing Sheets

MEDIA CONVERTER TO ENABLE ETHERNET IN THIN-PROFILE MOBILE DEVICES

This application claims priority to provisional application No. 61/667,687, filed Jul. 3, 2012, which is incorporated herein by reference in its entirety.

BACKGROUND

Field of the Invention

The present invention relates generally to Ethernet communication and, more particularly, to a media converter to enable Ethernet in thin-profile mobile devices.

Introduction

Mobile computing devices continue to proliferate as the benefits afforded by the portability of the mobile computing devices far outweighs any sacrifice in computing power. Continued advances in the complexity of today's mobile computing devices further diminishes any perceived sacrifice with respect to computing power.

Mobile computing devices continue to undergo an evolution in form factor as increased computing power is desired in thinner and more lightweight form factors. Such evolution in the form factor of mobile computing devices places increased demands on the port sizes that can be accommodated.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
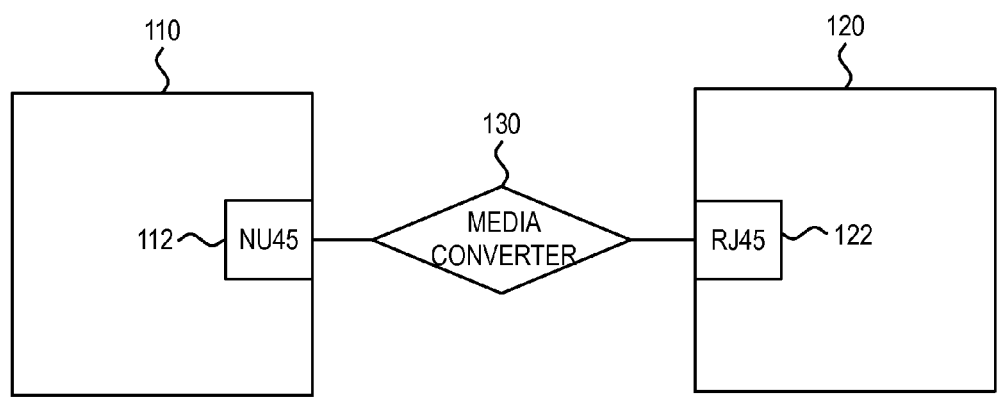
FIG. 1 illustrates an example embodiment of a media converter device that provides an interface between a mobile computing device and a network device.

Various embodiments of the invention are discussed in detail below. While specific implementations are discussed, it should be understood that this is done for illustration purposes only. A person skilled in the relevant art will recognize that other components and configurations may be used without parting from the spirit and scope of the invention.

A media converter device is provided that includes a first Ethernet physical layer device designed to communicate with a first device over a first Ethernet link that terminates on a low profile Ethernet port on the first device, wherein the low profile Ethernet port is smaller in height as compared to an RJ-45 Ethernet port. In one embodiment, the first Ethernet link has a first link rate and is limited to a short reach link distance. For example, the short reach link distance can be confined to less than 0.5 meters. In one embodiment, the first Ethernet physical layer device supports Ethernet communication over less than four wire pairs (e.g., one wire pair). This reduction in wire pairs leads to a corresponding reduction in circuitry required, which thereby lowers the costs of the first device. Further, in supporting a short reach link distance, the first device can have reduced requirements for isolation, magnetics, termination, and other circuitry, which also lowers the costs of the first device. In one embodiment, a short reach link distance can alternately be enabled using an alternate connector such as USB, HDMI, Lightning, or the like.

The media converter device also includes a second Ethernet physical layer device designed to communicate with a second device over a second Ethernet link that terminates on an RJ-45 Ethernet port of the second device, and a bridge device that transfers traffic between the first Ethernet physical layer device and the second Ethernet physical layer device. In one embodiment, the second Ethernet link has a second link rate that is different than the first link rate. In this embodiment, the bridge device can be configured to perform a rate adaptation between the first Ethernet physical layer device and the second Ethernet physical layer device. In a further embodiment, the bridge device is also coupled to an internal port that is configured to receive Ethernet traffic from one of the first device and the second device for management of the media converter device.

In one embodiment, the media converter device of the present invention can be configured for use with mobile computing devices such as laptops, handheld devices (e.g., mobile phones, audio/video devices, tablet devices, testing devices, etc.), or other devices that are targeting increasingly low-profile form factors. Such low-profile form factors present increasing challenges when considering network connectivity such as Ethernet that have conventionally relied on RJ-45 Ethernet ports. Due to size constraints presented by low-profile form factors, RJ-45 ports may not be practical for inclusion in low-profile mobile computing devices.

Reduction of the Ethernet port size to enable smaller Ethernet connectors and higher-density connections has its drawbacks. For example, Ethernet channels and circuitry are generally designed for operation in an enterprise environment, where long-distance connections such as 100 meters of twisted pair copper cabling are contemplated. In this context, reduction of the port size to enable smaller Ethernet connectors and higher-density connections may not present a cost-effective solution when considering the long-distance connections requirements in combination with requirements for isolation, magnetics, termination, etc. In the present invention, it is recognized that cost effectiveness is an increasingly valued design feature as the commoditization of mobile computing devices elevates the importance of lower overall device costs. Moreover, support of Ethernet in the mobile computing devices may not be a prominent design feature as multiple network connectivity options (e.g., wireless) often exist. Support for Ethernet connectivity via a wired interface is therefore desired, but is balanced in importance relative to traditional network devices.

In the present invention, it is recognized that an alternative to the reduction of the Ethernet port size is to use an adapter device that performs a conversion between an Ethernet protocol to another signaling protocol that uses a lower-profile port size (e.g., USB). A drawback to such an alternative, however, is that the conversion between two different signaling protocols introduces an undesirable latency impact on the traffic transport. This impact on latency can be significant when considering latency requirements for time-sensitive traffic such as that enabled via audio-video bridging (AVB) technology. For example, streaming media applications could be hampered in performance if the end-to-end connection is hampered by the latency hit introduced by a transport protocol conversion. In general, the latency impact imposed by the conversion between two different signaling protocols could preclude such mobile computing devices from operating with various forms of latency-sensitive traffic applications.

It is a feature of the present invention that the latency impact imposed by conversion between signaling protocols can be eliminated through a media converter device that is based on an Ethernet protocol. The elimination of protocol conversions results in lower capital expense as less equipment is needed by the consumer or the enterprise, and in lower operating expense as less management of additional devices is needed. In general, Ethernet connectivity is beneficial as the technology is pervasive in its reach, and provides clearly defined and understood network connectivity. A further benefit of Ethernet connectivity is the family of features that are provided such as energy efficient Ethernet (EEE), audio-video bridging (AVB), data center bridging (DCB), link aggregation (LinkAg), etc.

FIG. 1 illustrates an example embodiment of such a media converter device that provides an interface between a mobile computing device and a network device. As illustrated, media converter device 130 is situated between mobile computing device 110 and network device 120. Media converter device 130 is designed to interface with mobile computing device 110 via low-profile Ethernet port (NU45) 112, and to interface with network device 120 via conventional Ethernet port (RJ45) 122. As media converter 130 is designed to interface between Ethernet port 112 of mobile computing device 110 and Ethernet port 122 of network device 122, media converter 130 need not perform a protocol conversion. A latency impact that would otherwise be experienced through such a protocol conversion is thereby averted.

Figure 2:
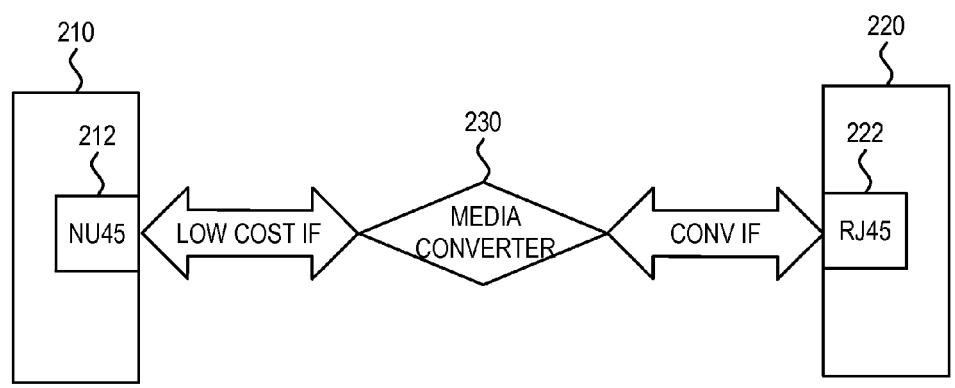
FIG. 2 illustrates an illustration of a functional impact of a media converter device of the present invention.

FIG. 2 illustrates a further illustration of the functional impact of a media converter device of the present invention. As illustrated, media converter device 230 is situated between mobile computing device 210 and network device 220. Media converter device 230 is designed to interface with mobile computing device 210 via low-profile Ethernet port (NU45) 212, and to interface with network device 220 via conventional Ethernet port (RJ45) 222.

As illustrated, the Ethernet link between media converter 230 and mobile computing device 210 can be designed as a low-cost interface. This low-cost interface can be designed to meet the limited needs of mobile computing device 210. For example, consider an implementation of mobile computing device 210 as a tablet device. In this example, the manufacturer of the tablet device can recognize the need to provide native support of a wired Ethernet connection without protocol conversion. Such desired support, however, comes with associated costs.

First, the form factor of a conventional wired Ethernet port may likely preclude its inclusion into the tablet device as the height of an RJ45 port would greatly exceed the height of the tablet device. Second, support of a conventional Ethernet port would require isolation, magnetics, termination, etc. that can support conventional Ethernet twisted pair link distances that approach 100 meters. The costs of such isolation, magnetics, termination, etc. would be inconsistent not only with the desired overall cost of the tablet device, but would also be inconsistent with the likely frequency of use of the wired Ethernet port. This is especially significant when considering the overall user base of the tablet device where a vast majority of the overall user base may never use the wired Ethernet port.

In the present invention, it is recognized that support of a lower cost native Ethernet interface would be consistent with its utility profile. In the present invention, this lower cost interface can be enabled by media converter 230, which connects to mobile computing device 210 via the lower cost interface, while exposing a conventional Ethernet interface to network device 220. An advantage of such a functional profile of media converter 230 is that it provides fully featured wired Ethernet support to a mobile computing device that can be designed with a low-cost profile. The low-cost advantage is therefore retained without sacrificing any of the full-array of features that would be expected by a small percentage of the user base.

Figure 3:
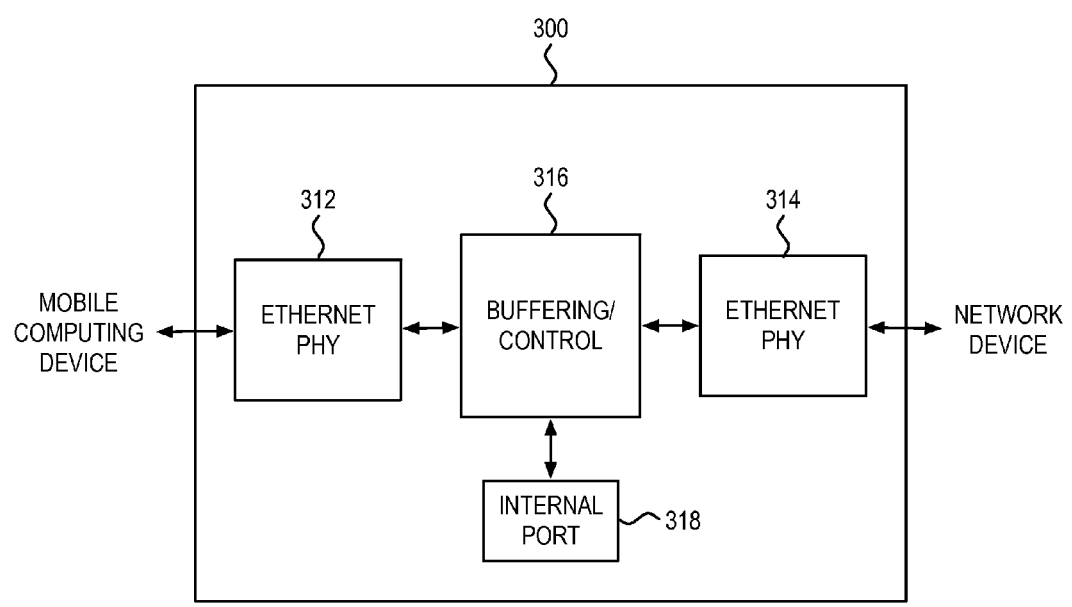
FIG. 3 illustrates an example of a media converter device.

FIG. 3 illustrates an example embodiment of a media converter device. As illustrated, media converter device 300 includes Ethernet physical layer device (PHY) 312 and Ethernet PHY 314 operating back to back. Here, Ethernet PHY 212 can be coupled to the mobile computing device via a low-cost Ethernet interface, while Ethernet PHY 214 can be coupled to a network device via a conventional Ethernet interface. Media converter device 300 can also include buffering and/or control logic 316 that is configured to bridge traffic between Ethernet PHY 312 and Ethernet PHY 314. In one embodiment, media converter device can embody a two-port MAC relay (TPMR). In one embodiment, module 316 may have switching and/or routing functionality as well as management functionality. In one example, the switching and/or routing functionality enables routing of traffic to an internal port of a three-port switch.

As noted above, Ethernet PHY 314 can be designed to interface with an Ethernet twisted pair cable (e.g., Category 3, 5, 5e, 6, 6A, 7, 7A, 8, etc. cabling) having a conventional RJ45 connector. This conventional Ethernet interface enables media converter device 300 to present an Ethernet interface to the network device that supports 100 meter cable lengths, isolation, magnetics, termination, etc. The limited application of a media converter device to a mobile computing devices serves to expose a conventional Ethernet interface and its attendant costs only to those situations where full featured Ethernet functionality is needed by the user. In one embodiment, Ethernet PHY 314 can be designed to interface to non-standard wiring (e.g., used in industrial control and/or automotive applications) that may or may not comply to channels defined by current or future work in IEEE 802.3.

Ethernet PHY 312, on the other hand, can be designed to operate with a low-profile Ethernet port on the mobile computing device. As would be appreciated, the particular form of the low-profile Ethernet port would be implementation dependent. In general, this low-profile Ethernet port (NU45) can be used to accommodate a native Ethernet connection on the low-profile mobile computing devices in a low-cost manner. It is significant to note here that the low-profile Ethernet port can be designed with a lower cost profile due to its support of short-reach link distances as compared to conventional 100 meter twisted pair link distances. For example, the low-profile Ethernet port can be designed to support link distances up to 0.5 meters. This limited reach specification can be designed to support direct or semi-direct connection of the media converter device to the mobile computing device.

Again, as the low-profile Ethernet port need not support a 100 meter link distance, the low-profile Ethernet port can be designed with reduced isolation, magnetics, termination, etc. requirements. For example, a short-reach channel can be enabled by taking an existing enterprise transmission specification (e.g., 10 GBASE-T) and removing circuitry (e.g., transformers, error correction, etc.) to facilitate a consumer-application short-reach channel. In one embodiment, the low-profile Ethernet port can be designed to support a reduced twisted pair gigabit Ethernet interface such as that provided by Broadcom BroadR-Reach® technology.

In one embodiment, media converter device 300 can be designed in a dongle form factor where media converter device 300 is designed to plug directly into a low-profile Ethernet port of the mobile computing device. On the network side, the media converter device can present a network interface based on current speeds (e.g., 1G, 10G, 40G, 100G, 400G, etc.), etc.), future speeds, or non-standard speeds (e.g., 2.5G, 12.5G, 25G, 50G, etc.) using various types of media. In other embodiments, the media converter device can be incorporated as part of a wall connector or a docking station to facilitate cost-effective, yet fully-featured network connectivity.

Figure 4:
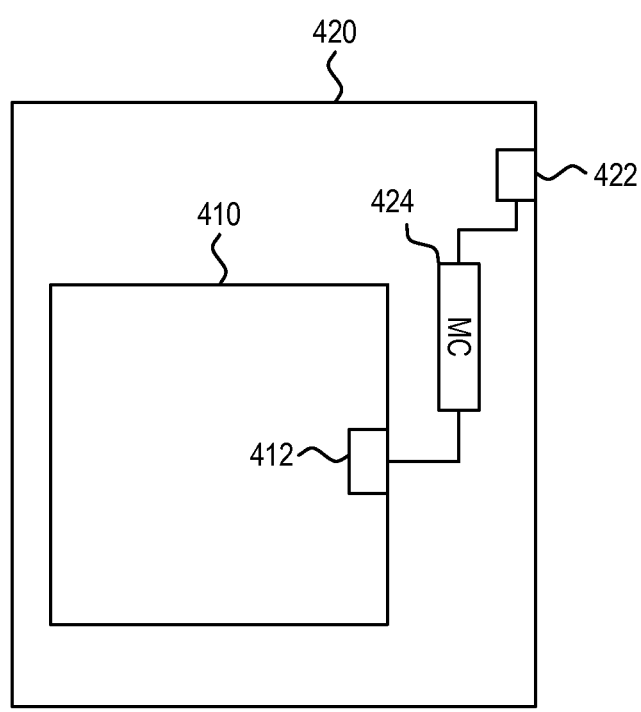
FIG. 4 illustrates an embodiment of a media converter device that is integrated with a mechanical structure that is attached or otherwise integrated with a mobile computing device.

FIG. 4 illustrates an example of such an embodiment where a media converter is integrated with a mechanical structure that is attached or otherwise integrated with a mobile computing device. As illustrated, mobile computing device 410 (e.g., mobile phone, tablet device, etc.) is attached or otherwise integrated with a mechanical structure 420. In one example, mechanical structure 420 is a case that at least partially surrounds mobile computing device 410. Mobile computing device 410 includes port 412 which is attached to media converter 424, which is integrated with mechanical structure 420. Media converter 424 is also coupled to external port 422, which is exposed by mechanical structure 420 for network connectivity.

In one embodiment, Ethernet PHY 312 and Ethernet PHY 314 can be designed to operate with different link speeds. In this embodiment, the first Ethernet link between the media converter device and the mobile computing device would operate at a first link rate, while the second Ethernet link between the media converter device and the network device would operate at a second link rate that is different than the first link rate. The support of different link rates by the media converter device enables further cost-effectiveness in the design of the mobile computing device. As would be appreciated, either the first link rate or the second link rate could be the higher link rate. In general, the particular type of connectivity desired to be supported in a given application would dictate the difference in link rates.

In a simple example, a first side of the media converter device can implement a 40G link, while a second side of the media converter device can implement 1000BASE-T. Here, it should be noted that various types of media can be supported by the media converter device. In one example, one side of the media converter device facilitates a twisted pair link while another side of the media converter device facilitates an optical link. In another example, one side of the media converter can support Ethernet over DSL such as 10PASS-TS or 2BASE-TL.

As the actual use of the wired Ethernet link in the mobile computing device may be relatively infrequent across the user base, further cost savings can be achieved through the lowering of the actual link rate supported across the wired Ethernet link. In general, a lower link rate will cost less to implement in the mobile computing device. In the present invention, this lower link rate can still be supported while still exposing a standard Ethernet interface at the other end of the media converter device.

For example, Ethernet PHY 314 can be designed to operate at a one Gbit/s link speed (e.g., 1000BASE-T), while Ethernet PHY 312 can be designed to operate at a 400 Mbit/s link speed. In this example, buffering/control 316 can be designed to support a rate adaptation between Ethernet PHY 312 and Ethernet PHY 314 to address the mismatch in the two link rates, wherein either PHY 312 or 314 can operate at a higher rate. As would be appreciated, the difference in the first link rate between the media converter device and the mobile computing device and the second link rate between the media converter device and the network device can dictate the amount of buffering that is implemented by the media converter device. Here, it should be noted that buffering can enable a device to burst traffic at a higher rate than it would otherwise be able. For example, data originating at the mobile computing device can accumulate in the buffer of the media converter, whereupon the media converter can burst the buffered data at a higher rate to a network device.

As has been described, a media converter device can be provided that presents a short-reach Ethernet interface to a mobile computing device that enables a low-cost, low-profile Ethernet port interface, while also presenting a conventional Ethernet port interface to a network device. Such a media converter device would retain the Ethernet protocol, while eliminating any unnecessary protocol conversions, thereby reducing any latency impact.

In one embodiment, the media converter device can also be powered via power over Ethernet (PoE) technology as defined by IEEE 802.3. In that regard, the media converter device can operated as a powered device (PD) that is powered by a power sourcing equipment (PSE) that exists on the mobile computing device side or on the network side of the media converter device. Further, the media converter device can also include a PSE module in addition to a PD module. In one example, the media converter device can receive power from the network side using the PD module, and deliver power to the mobile computing device via the PSE module. As would be appreciated, the powering provided by the PSE can be in addition to power provided by an alternate power source (e.g., battery, AC power adapter, etc.)

In one embodiment, the media converter device can also implement IEEE 802.3 distinguished minimum latency traffic (DMLT), which enables guaranteed bandwidth and guaranteed minimum latency for control-data traffic and audio-video streams without violating best-effort traffic.

As further illustrated in FIG. 3, the media converter device can also include an internal port 318. In this embodiment, media converter 300 can include switching functionality along with the buffering/control to enable traffic to be routed to internal port 318. This traffic that is routed to internal port 318 can be used to facilitate various management functions based on the communication of management traffic between the media converter device and one or both of the mobile computing device and the network device. In one example, the internal port 318 can be used by a user of the mobile computing device to configure the operation of the media converter device. In various applications, the configuration of the media converter device can include performance feature configuration (e.g., link speeds, buffering, latency, etc.), energy saving configuration (e.g., energy saving states, wake-up time, energy saving aggressiveness, etc.), diagnostic configuration, security configuration (e.g., implementing an enterprise policy of what information or type of information is allowed to be transmitted to the mobile computing device from the network), or configuration of any other feature relating to the transmission of traffic between the mobile computing device and the network device.

Another embodiment of the invention may provide a machine and/or computer readable storage and/or medium, having stored thereon, a machine code and/or a computer program having at least one code section executable by a machine and/or a computer, thereby causing the machine and/or computer to perform the steps as described herein.

These and other aspects of the present invention will become apparent to those skilled in the art by a review of the preceding detailed description. Although a number of salient features of the present invention have been described above, the invention is capable of other embodiments and of being practiced and carried out in various ways that would be apparent to one of ordinary skill in the art after reading the disclosed invention, therefore the above description should not be considered to be exclusive of these other embodiments. Also, it is to be understood that the phraseology and terminology employed herein are for the purposes of description and should not be regarded as limiting.

What is claimed is:

1. A media converter device, comprising:
    a first Ethernet physical layer device comprising a low profile Ethernet port, the first Ethernet physical layer device designed to communicate with a first device over a first Ethernet link that terminates on a corresponding low profile Ethernet port on the first device, the first Ethernet link having a first link rate and being limited to a short reach link distance;
    a second Ethernet physical layer device comprising an RJ-45 Ethernet port, the second Ethernet physical layer device designed to communicate with a second device over a second Ethernet link that terminates on a corresponding RJ-45 Ethernet port of the second device, the second Ethernet link having a second link rate, wherein the low profile Ethernet port is smaller in height as compared to the RJ-45 Ethernet port; and
    a bridge device that transfers traffic between the first Ethernet physical layer device and the second Ethernet physical layer device.

2. The media converter device of claim 1, wherein the short reach link distance is less than 0.5 meters.

3. The media converter device of claim 1, wherein the first Ethernet physical layer device supports Ethernet communication over less than four wire pairs.

4. The media converter device of claim 3, wherein the first Ethernet physical layer device supports Ethernet communication over a single wire pair.

5. The media converter device of claim 4, wherein the second Ethernet physical layer device supports Ethernet communication over four wire pairs.

6. The media converter device of claim 1, wherein the media converter device is a dongle having an end that contains the first Ethernet physical layer device, the first end of the device being configured for insertion into the low profile Ethernet port of the first device.

7. The media converter device of claim 1, wherein the second Ethernet link supports link distances up to 100 meters.

8. The media converter device of claim 1, wherein the first link rate is the same as the second link rate.

9. The media converter device of claim 1, wherein the first link rate is lower than the second link rate, and the bridge device is configured to perform a rate adaptation between the first Ethernet physical layer device and the second Ethernet physical layer device.

10. The media converter device of claim 1, further comprising an internal port that is coupled to the bridge device, the internal port being configured to pass Ethernet traffic received from one of the first device and the second device to the media converter device for management of the media converter device.

11. The media converter device of claim 1, wherein the media converter device is part of a wall connector device.

12. The media converter device of claim 1, wherein the media converter device is part of a docking station.

13. The media converter device of claim 1, wherein the media converter device is part of a case for a mobile computing device.

14. A media converter device, comprising:
    a first Ethernet physical layer device comprising a low profile Ethernet port designed to communicate with a mobile computing device over a first link that terminates on a corresponding low profile Ethernet port of the mobile computing device;
    a second Ethernet physical layer device comprising an RJ-45 Ethernet port designed to communicate with a network device over a second link that terminates on a corresponding RJ-45 Ethernet port of the network device, wherein the low profile Ethernet port is smaller in height as compared to the RJ-45 Ethernet port; and
    a buffer device that couples the first and second Ethernet physical layer devices.

15. The media converter device of claim 14, wherein the mobile computing device is a laptop device.

16. The media converter device of claim 14, wherein the mobile computing device is a mobile phone device.

17. The media converter device of claim 14, wherein the mobile computing device is a tablet device.

18. The media converter device of claim 14, wherein the media converter device is a dongle device.

19. The media converter device of claim 14, wherein the media converter device is part of a docking station.

20. A media converter device, comprising:
    an RJ-45 Ethernet interface configured to operate over a first distance;
    a NU-45 Ethernet interface configured to operate over a second distance less than the first distance, the NU-45 Ethernet interface smaller in height than the RJ-45 Ethernet interface; and
    a bridge device configured to transfer traffic between the RJ-45 Ethernet interface and the NU-45 Ethernet interface.

* * * * *

UNITED STATES PATENT AND TRADEMARK OFFICE
CERTIFICATE OF CORRECTION

| | |
|---|---|
| PATENT NO. | : 9,203,779 B2 |
| APPLICATION NO. | : 13/906812 |
| DATED | : December 1, 2015 |
| INVENTOR(S) | : Wael William Diab and Michael David Johas Teener |

It is certified that error appears in the above-identified patent and that said Letters Patent is hereby corrected as shown below:

In the claims

Please replace column 7, line 35 with the following corrected version:

-- 2. The media converter device of claim 1, wherein the short --

Signed and Sealed this
Twenty-second Day of March, 2016

Michelle K. Lee
*Director of the United States Patent and Trademark Office*